(12) United States Patent
Ishimoto (10) Patent No.: US 9,134,941 B2
(45) Date of Patent: Sep. 15, 2015

(54) PRINTER

(75) Inventor: Kan Ishimoto, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 912 days.

(21) Appl. No.: 12/941,567

(22) Filed: Nov. 8, 2010

(65) Prior Publication Data

US 2011/0157627 A1 Jun. 30, 2011

(30) Foreign Application Priority Data

Dec. 28, 2009 (JP) .................................. 2009-298209

(51) Int. Cl.
*G06F 15/00* (2006.01)
*G06F 3/12* (2006.01)

(52) U.S. Cl.
CPC ............ *G06F 3/1285* (2013.01); *G06F 3/1206* (2013.01); *G06F 3/1228* (2013.01)

(58) Field of Classification Search
CPC ... G06F 3/1206; G06F 3/1208; G06F 3/1219; G06F 3/1222; G06F 3/1228; G06F 3/1238; G06F 3/1253; G06F 3/1256; G06F 3/1265; G06F 3/1267; G06F 3/1285; G06F 3/1287; G06F 3/1288; G06F 3/1292; G06F 3/1296; G06F 17/24; G06F 17/30265; G06F 21/608; G06F 21/629; G03G 15/502; G03G 15/5087; H04N 1/00132; H04N 1/00164; H04N 1/00442; H04N 1/00453
USPC ........................................................ 358/1.15
See application file for complete search history.

(56) References Cited

U.S. PATENT DOCUMENTS

| | | | |
|---|---|---|---|
| 2002/0046238 A1* | 4/2002 | Estavillo et al. ............... | 709/203 |
| 2003/0035144 A1* | 2/2003 | Shima .......................... | 358/1.18 |
| 2003/0132969 A1* | 7/2003 | Tanaka et al. ................. | 345/783 |
| 2003/0197892 A1 | 10/2003 | Fukuoh | |

(Continued)

FOREIGN PATENT DOCUMENTS

| | | |
|---|---|---|
| EP | 1 132 808 A1 | 9/2001 |
| JP | 2001-265555 | 9/2001 |
| JP | 2003132249 A | 5/2003 |

(Continued)

OTHER PUBLICATIONS

Japanese Official Action dated Apr. 2, 2013 received in related application JP 2009-298209.

(Continued)

*Primary Examiner* — Chuong A Ngo
*Assistant Examiner* — Mark Milia
(74) *Attorney, Agent, or Firm* — Scully, Scott, Murphy & Presser P.C.

(57) ABSTRACT

A printer may supply edit web page data to an external device for a web browser to display an edit web page. The edit web page may include a first area for displaying an object corresponding to object data to be edited. The printer may receive operation information corresponding to a first type of operation from the web browser. The printer may edit the object data in response to the operation information. The printer may send update information for updating a displaying content within the edit web page to the web browser. The printer may receive a first type of print instruction from the web browser. The printer may perform a print process using the object data stored in the storing unit upon receiving the first type of print instruction.

12 Claims, 3 Drawing Sheets

(56) References Cited

U.S. PATENT DOCUMENTS

2009/0290182 A1\* 11/2009 Hashimoto et al. ............ 358/1.9
2011/0145694 A1\* 6/2011 Graves et al. ................. 715/234

FOREIGN PATENT DOCUMENTS

| JP | 2003-316530 | | 11/2003 |
| JP | 2004086419 | A | 3/2004 |
| JP | 2007013288 | A | 1/2007 |
| JP | 2007124151 | A | 5/2007 |
| JP | 2007166015 | A | 6/2007 |
| JP | 2008271235 | A | 11/2008 |

OTHER PUBLICATIONS

Chinese Official Action dated Mar. 26, 2013 received in related application CN 201010621682.X.
Chinese Office Action dated Nov. 4, 2013 for the corresponding Chinese Patent Application No. 201010621682.X.
Chinese Office Action dated May 12, 2014 for the corresponding Chinese Patent Application No. 201010621682.X.
Extended European Search Report dated Feb. 15, 2013 received from related Application No. 10251949.3.

\* cited by examiner

PRINTER

CROSS-REFERENCE TO RELATED APPLICATIONS

This application claims priority to Japanese Patent Application No. 2009-298209, filed on Dec. 28, 2009, the contents of which are hereby incorporated by reference into the present application.

TECHNICAL FIELD

The present specification discloses a printer configured to connect with an external device in a communicable manner.

DESCRIPTION OF RELATED ART

In a conventional technique, a client (external device) uses an application installed in the client itself so as to generate or edit a data file. In a case where the client instructs a printer server to print the data file, the client receives a printer driver from the printer server. The client converts the print target data file into print data (PDL data) using the received printer driver, and then sends the converted print data to the printer server.

SUMMARY

Hence, the printer driver must be installed in the client for the client to cause the printer to perform print. Further, the application must be installed in the client for the client to generate or edit the data file. This specification provides a printer that can edit data in accordance with an operation from a client (external device) that is not installed with an application and perform print in response to a print instruction from a client that is not installed with a printer driver.

This specification discloses a printer. This printer may be configured to connect with an external device in a communicable manner. The external device may comprise a web browser. The printer may comprise a supplying unit, a storing unit, an operation information receiving unit, an editing unit, an update information sending unit, a print instruction receiving unit and a print performing unit. The supplying unit may be configured to supply edit web page data to the external device for the web browser to display an edit web page in a case where the external device accesses the printer using the web browser. The edit web page may include a first area for displaying an object corresponding to object data to be edited and a second area different from the first area. The storing unit may be configured to store the object data. The operation information receiving unit may be configured to receive operation information corresponding to a first type of operation from the web browser in a case where the first type of operation is performed to the first area included in the edit web page. The editing unit may be configured to edit the object data stored in the storing unit in response to the operation information received by the operation information receiving unit. The update information sending unit may be configured to send update information for updating a displaying content within the edit web page to the web browser in response to the operation information received by the operation information receiving unit. The print instruction receiving unit may be configured to receive a first type of print instruction from the web browser in a case where a second type of operation is performed to the second area included in the edit web page. The print performing unit may be configured to perform a print process using the object data stored in the storing unit in a case where the print instruction receiving unit receives the first type of print instruction.

Incidentally, a control method, a computer program and a non-transitory recording medium storing such computer program for realizing the printer described above also exhibit novelty and usefulness.

EMBODIMENT

Configuration of Network System 2

Figure 1:
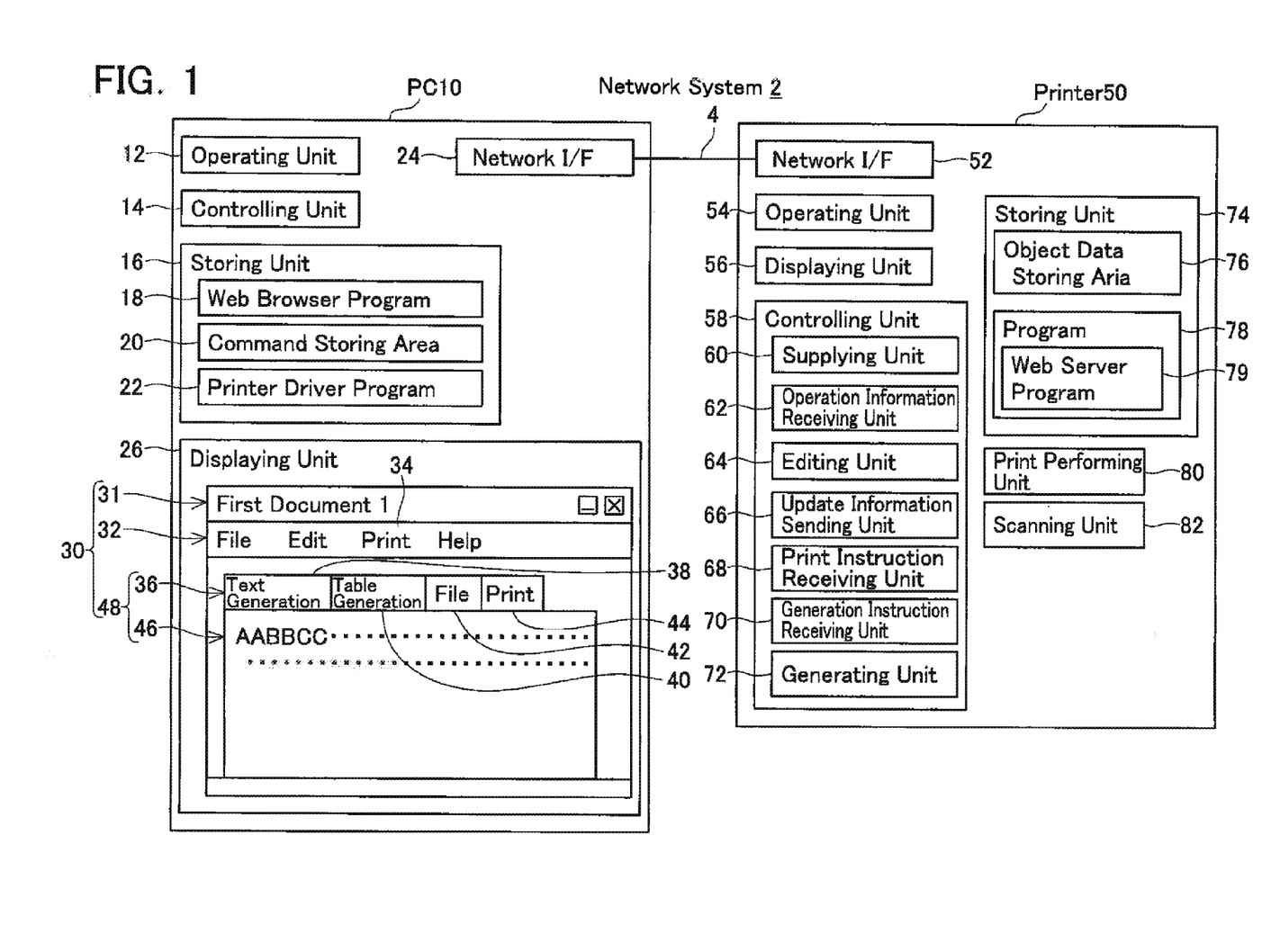
FIG. 1 shows a configuration of a network system.

A first embodiment will be described with reference to the drawings. FIG. 1 shows the configuration of a network system 2 according to this embodiment. The network system 2 includes a PC 10, a printer 50, and a LAN 4. The PC 10 and the printer 50 are connected to the LAN 4. The PC 10 and the printer 50 are capable of communicating with each other via the LAN 4.

Configuration of PC 10

The PC 10 includes an operating unit 12, a controlling unit 14, a storing unit 16, a network interface 24, and a displaying unit 26. The operating unit 12 includes a keyboard and a mouse. A user can cause the PC 10 to perform various processes by operating the operating unit 12. For example, by operating the operating unit 12, the user can activate a web browser program 18. Further, by operating the operating unit 12, the user can input characters, e.g. alphabets, etc. into the PC 10.

The controlling unit 14 performs various processes in accordance with the web browser program 18 and a printer driver program 22, which are stored in the storing unit 16. The storing unit 16 stores the web browser program 18 and the printer driver program 22. The web browser program 18 is software for performing various processes when the PC 10 communicates with the external device, such as receiving web page data from an external device (the printer 50, for example) having a web server function and displaying a web page corresponding to the web page data. The printer driver program 22 is software for sending various instructions (a print instruction, for example) to the printer 50. The respective programs 18, 22 may be installed in the PC 10 from the non-transitory computer-readable medium storing the programs 18, 22 or from a server on the Internet, for example. The storing unit 16 includes a command storing area 20 for storing a command received from the external device (e.g. the printer 50). The network interface 24 is an interface for communicating with the printer 50 via the LAN 4. The displaying unit 26 is a display for displaying various types of information. The displaying unit 26 is capable of displaying a web page.

Configuration of Printer 50

The printer 50 includes a network interface 52, an operating unit 54, a displaying unit 56, a controlling unit 58, a storing unit 74, a print performing unit 80, and a scanning unit 82. The network interface 52 is an interface for communicating with the PC 10 via the LAN 4. The operating unit 54 includes a plurality of keys (a numeric keypad and a start key, for example). By operating the operating unit 54, the user can cause the scanning unit 82 to scan a document set on the scanning unit 82 to generate object data. The displaying unit 56 is a display for displaying various types of information. The controlling unit 58 performs various processes in accordance with a program 78 stored in the storing unit 74. When the controlling unit 58 performs processing in accordance with a web server program 79 of the program 78, functions of a supplying unit 60, an operation information receiving unit 62, an editing unit 64, an update information sending unit 66, a print instruction receiving unit 68, a generation instruction receiving unit 70, and a generating unit 72 are realized.

The storing unit 74 stores the program 78. The program 78 includes a program (e.g. the web server program 79) for processing performed by the controlling unit 58, the print performing unit 80, and the scanning unit 82. The web server program 79 includes word processing software, spreadsheet software, image editing software, etc. The web server program 79 also includes a plurality of commands to be described below. The storing unit 74 includes an object data storing area 76. The object data storing area 76 is capable of storing object data generated by the generating unit 72 and the scanning unit 82. The object data storing area 76 is also capable of storing object data received from the external device. Examples of the external device include the PC 10, an Internet server, a device connected to the LAN 4, a portable storage medium, etc. The print performing unit 80 performs a print process in response to a received print instruction. In the print process, the print performing unit 80 prints an image represented by print target data on a print medium. The scanning unit 82 performs a scan process in response to a received scan instruction. In the scan process, the scanning unit 82 generates object data (e.g. text data or image data) by scanning an original set on the scanning unit 82. The scanning unit 82 stores converted object data in the object data storing area 76.

Processing Performed by PC 10 and Printer 50

Next, processing performed by the PC 10 and the printer 50 will be described in detail. First, a case in which the PC 10 causes the printer 50 to generate new object data will be described as a first embodiment. Then a case in which the PC 10 selects object data from the object data stored in the printer 50 will be described as a second embodiment.

First Embodiment

Figure 2:
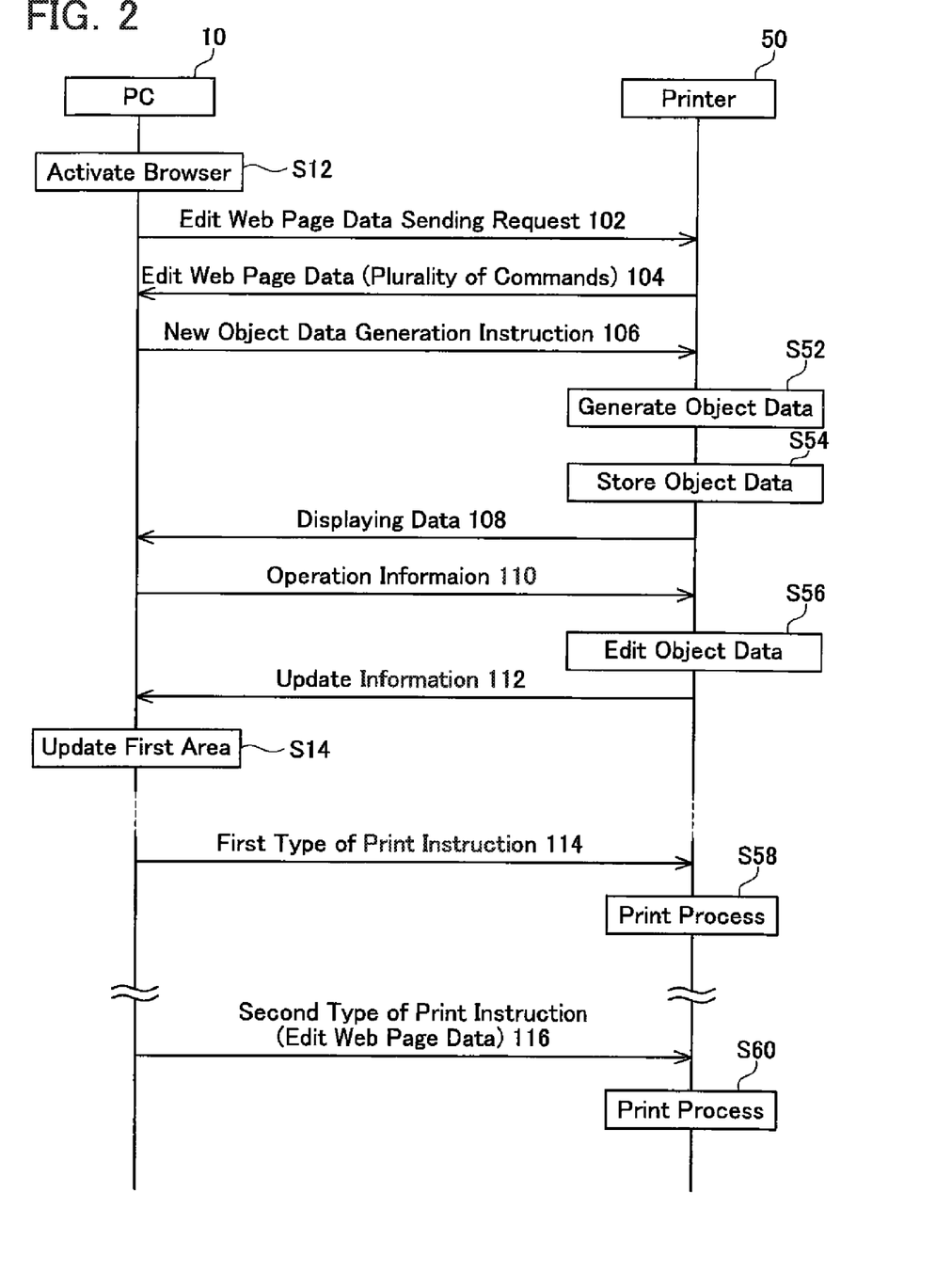
FIG. 2 is a sequence diagram showing an example of data communication in the network system.

As shown in FIG. 2, when the user performs an activating operation for activating the web browser program 18 on the operating unit 12 (see FIG. 1) of the PC 10, the process starts. When the aforementioned activating operation is performed, the controlling unit 14 (see FIG. 1) of the PC 10 activates the web browser program 18 (S12). Thereafter, the controlling unit 14 performs a process in accordance with the web browser program 18. The controlling unit 14 generates an edit web page data sending request 102 in accordance with HTTP (Hypertext Transfer Protocol). The controlling unit 14 sends the generated edit web page data sending request 102 to the printer 50.

Upon receiving the edit web page data sending request 102, the supplying unit 60 (see FIG. 1) of the printer 50 generates edit web page data 104 described by HTML (Hyper Text Markup Language). The edit web page data 104 includes a plurality of commands. The supplying unit 60 sends the generated edit web page data 104 to the PC 10. The controlling unit 14 of the PC 10 displays a screen 30 including an edit web page 48 corresponding to the received edit web page data 104 on the displaying unit 26 (see FIG. 1). Further, the controlling unit 14 stores the plurality of commands included in the received edit web page data 104 in the command storing area 20.

As shown in FIG. 1, the screen 30 includes a title displaying area 31, a control menu displaying area 32, and the edit web page 48. The title displaying area 31 is an area for displaying a title corresponding to the edit web page 48. A "file" menu, an "edit" menu, a "print" menu 34, a "help" menu, and so on are displayed in the control menu displaying area 32. By operating the operating unit 12, the user can select a menu from the control menu displaying area 32. When a menu is selected by the user, the controlling unit 14 performs process corresponding to the selected menu in accordance with the web browser program 18. For example, when the user selects the "print" menu 34, the controlling unit 14 sends a second type of print instruction, to be described below, to the printer 50 in accordance with the printer driver program 22 (see FIG. 1). The content displayed in the control menu displaying area 32 is determined in advance by the web browser program 18.

The edit web page 48 includes a first area 46 and a second area 36. An object corresponding to displaying data received from the printer 50 is displayed in the first area 46. A plurality of instruction buttons 38, 40, 42, 44 included in the edit web page data is displayed in the second area 36. By operating the operating unit 12, the user can select the instruction buttons 38, 40, 42, 44 in the second area 36. When the user selects a button, the controlling unit 14 performs a process corresponding to the selected button in accordance with the web browser program 18.

A case in which the user performs a generating operation for selecting a text generation button 38 will now be described. The controlling unit 14 sends a new object data generation instruction 106 to the printer 50 in response to a generation instruction sending command, from among the plurality of commands stored in the command storing area 20. The new object data generation instruction 106 includes information indicating word processing software. The generation instruction receiving unit 70 (see FIG. 1) of the printer 50 receives the new object data generation instruction 106. Next, the generating unit 72 (see FIG. 1) generates new object data corresponding to the word processing software in response to the new object data generation instruction 106 (S52). The object data generated in S52 is data representing a sheet of white paper on which no text has been input. The generating unit 72 determines a data name of the object data. The generating unit 72 then stores a combination of the generated object data and data name information indicating the determined data name in the object data storing area 76 (see FIG. 1) (S54). The generating unit 72 stores the object data in a PDL (Page Description Language) format. The object data may be stored e.g. in a PostScript format. The supplying unit 60 generates displaying data 108 corresponding to the generated object data. The supplying unit 60 generates the displaying data 108 in a format (e.g. HTTP, HTML) that can be interpreted by the controlling unit 14 of the PC 10 in accordance with the web browser program 18. The supplying unit 60 then sends the generated displaying data 108 and the data name information corresponding to the object data to the PC 10.

The controlling unit 14 of the PC 10 displays an object corresponding to the received displaying data 108 (i.e. an object corresponding to the object data generated in S52) in the first area 46 (see FIG. 1) of the edit web page 48. By operating the operating unit 12 of the PC 10, the user can perform an editing operation in order to input and delete characters and the like in relation to the object displayed in the first area 46. The controlling unit 14 then generates operation information 110 corresponding to the editing operation in accordance with an operation information sending command, from among the plurality of commands included in the edit web page data 104 (i.e., the plurality of commands stored in the command storing area 20). The operation information 110 in a case where the user performs an editing operation in order to input a character string "AABBCC" will now be described. The controlling unit 14 generates the operation information 110 based on XMLHttpRequest (Extensible Markup Language Http Request). The operation information 110 includes the character string "AABBCC", information indicating a position of the character string in the object data, and data name information. Note that in another embodiment, the controlling unit 14 may generate the operation information 110 based on JSON (JavaScript Object Notation) or JSONP (JavaScript Object Notation with Padding).

The controlling unit 14 sends the generated operation information 110 to the printer 50. The operation information receiving unit 62 (see FIG. 1) of the printer 50 receives the sent operation information 110. Next, the editing unit 64 (see FIG. 1) edits the object data stored in the object data storing area 76 in accordance with the received operation information 110 (S56). That is, in accordance with the word processing software, the editing unit 64 writes the character string "AABBCC" included in the operation information 110 and information to be disposed in the position indicated by the position information included in the operation information 110 into the object data stored in S54. The update information sending unit 66 (see FIG. 1) generates update information 112 in accordance with the operation information 110. The update information sending unit 66 generates the update information 112 based on XMLHttpRequest. The update information sending unit 66 (see FIG. 1) sends the generated update information 112 to the PC 10.

The controlling unit 14 of the PC 10 updates the content displayed in the first area 46 in accordance with the received update information 112 by performing a display update command, from among the plurality of commands included in the edit web page data 104 (S14).

In accordance with editing operations performed on the operating unit 12 by the user, the PC 10 and the printer 50 repeat the process for sending the operation information 110 to the printer 50 from the PC 10, the process performed by the printer 50 in S56, sending the update information 112 to the PC 10 from the printer 50, and the process performed by the PC 10 in S14.

A specific example relating to the update information 112 and the process of S14 will now be described. First, a case in which the operation information 110 corresponding to the edit operation performed when the object corresponding to the object data (data in which no text has been input) generated in S52 is displayed in the first area 46 is received by the printer 50 will be described. For example, in a case where the operation information 110 includes the character string "AABBCC" and position information indicating an nth line (where n is a natural number) of the object, the update information sending unit 66 generates update information 112 including information for displaying the character string "AABBCC" on the nth line. In S14, upon receiving the update information 112, the controlling unit 14 of the PC 10 updates the displaying data 108 such that the character string "AABBCC" included in the update information 112 is disposed on the nth line of the object corresponding to the displaying data 108. Next, the controlling unit 14 displays an image represented by the updated displaying data 108 in the first area 46.

Next, a case in which the printer 50 receives operation information 110 including a character string "DDEEFF" and position information indicating a position following the character string "AABBCC" on the nth line of the object will be described. The update information sending unit 66 generates update information 112 including information for displaying the character string "AABBCCDDEEFF" on the nth line. Note that when a character string has already been disposed on an n−1th line in another embodiment, the update information 112 may also include the character string disposed on the n−1 th line. Upon receiving of the update information 112, the controlling unit 14 updates the displaying data 108 such that the character string "AABBCCDDEEFF" included in the update information 112 is disposed on the nth line of the object corresponding to the displaying data 108. Next, the controlling unit 14 displays an image represented by the updated displaying data 108 in the first area 46. That is, the controlling unit 14 updates the content displayed in the first area 46 of the screen 30 but does not update the content displayed in the areas 31, 32, 36 other than the first area 46.

By operating the operating unit 12, the user can perform a first print operation for selecting a print button 44 in the second area 36. In this case, the controlling unit 14 performs a print instruction sending command, from among the plurality of commands included in the edit web page data. More specifically, the controlling unit 14 generates a first type of print instruction 114 including the data name information relating to the displaying data 108. Next, the controlling unit 14 sends the generated first type of print instruction 114 to the printer 50. The print instruction receiving unit 68 (see FIG. 1) of the printer 50 receives the first type of print instruction. The print performing unit 80 (see FIG. 1) of the printer 50 obtains object data corresponding to the data name information included in the received first type of print instruction from the object data storing area 76. The print performing unit 80 prints an image represented by the obtained object data onto a print medium (S58).

Further, by operating the operating unit 12, the user can perform a second print operation for selecting the print menu 34 in the control menu displaying area 32. In this case, the controlling unit 14 converts the edit web page data into PDL data in accordance with the printer driver program 22. The controlling unit 14 sends a second type of print instruction 116 including the converted edit web page data to the printer 50. The edit web page data includes data indicating the content displayed in the first area 46 of the screen 30 and data indicating the content displayed in the second area 36. The print instruction receiving unit 68 of the printer 50 receives the second type of print instruction. The controlling unit 58 supplies the received PDL data to the print performing unit 80. The print performing unit 80 prints an image represented by the PDL data (edit web page data) onto a print medium by performing a printing process on the supplied PDL data (S60).

Second Embodiment

Figure 3:
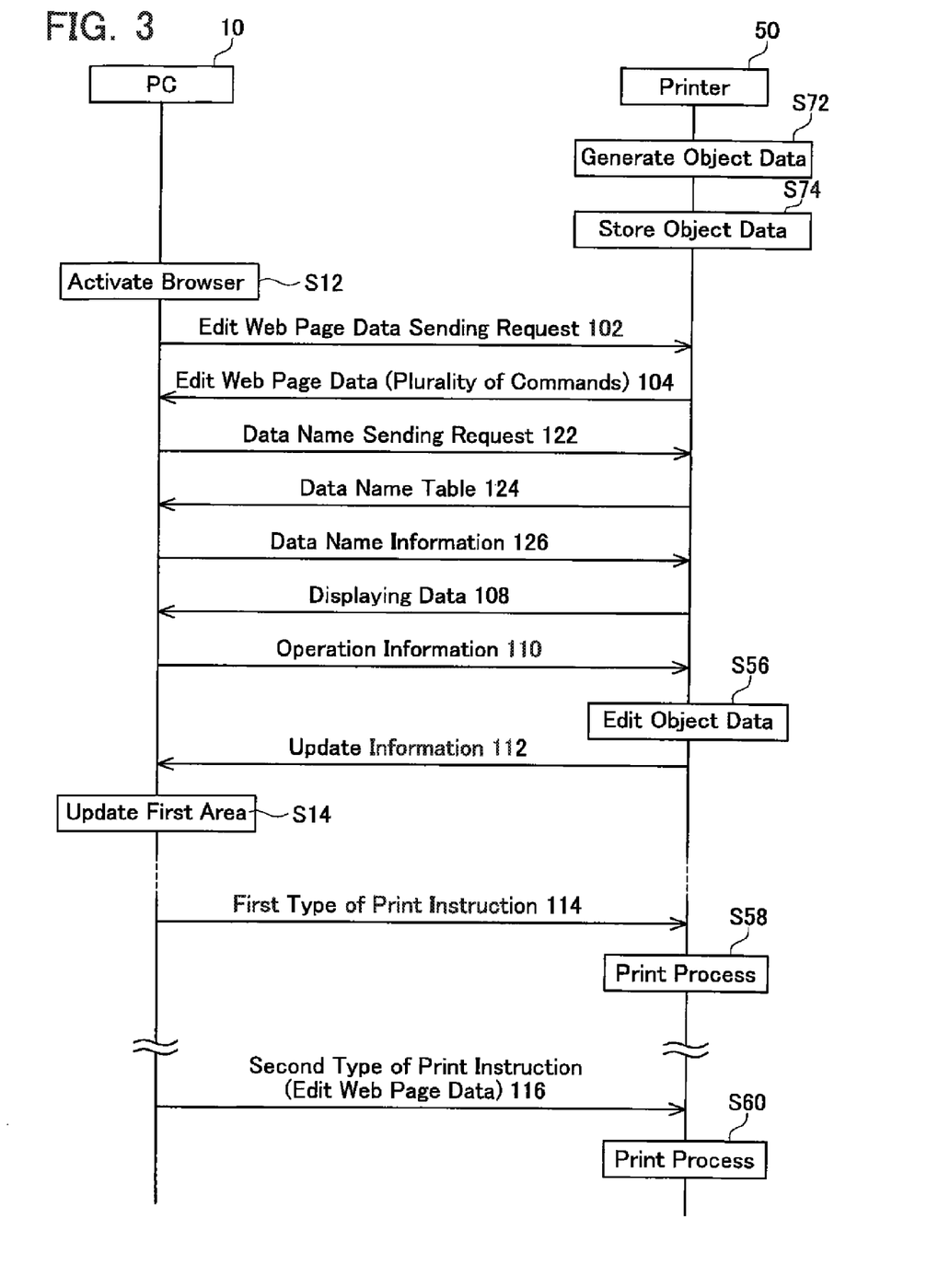
FIG. 3 is a sequence diagram showing another example of data communication in the network system.

Next, a case in which the PC 10 selects object data from the object data stored in the printer 50 will be described with reference to FIG. 3. The user can perform an operation for scan process on the operating unit 54 of the printer 50 so as to cause the scanning unit 82 (see FIG. 1) to perform the scan process by setting a document on the scanning unit 82. In the scan process, the scanning unit 82 generates object data corresponding to the document set on the scanning unit 82 by scanning the document (S72). The scanning unit 82 stores the generated object data in the object data storing area 76 (S74). The object data generated by the scanning unit 82 is image data. Further, the controlling unit 58 may store object data received from an external device (the PC 10, for example) or object data input from an external memory in the object data storing area 76. In this case, the object data is stored after being converted into the PDL format by the printer 50.

The process performed by the PC 10 in S12 and the process for communicating the edit web page data sending request 102 and the edit web page data 104 between the PC 10 and the printer 50 are similar to those shown in FIG. 2.

By operating the operating unit 12 of the PC 10, the user can select a file button 42 (see FIG. 1) in the second area 36 of the screen 30. When the file button 42 is operated, the controlling unit 14 sends a data name sending request 122 to the printer 50 in response to a data name request command, from among the plurality of received commands. The controlling unit 58 of the printer 50 generates a data name table 124 including data names corresponding to the object data stored in the object data storing area 76. The controlling unit 58 then sends the data name table 124 to the PC 10.

The controlling unit 14 of the PC 10 displays the received data name table 124 in the first area 46. By operating the operating unit 12, the user can perform an operation for selecting one data name from among the data names included in the data name table 124. When an operation for selecting one data name is performed, the controlling unit 14 sends data name information 126 indicating the selected data name to the printer 50 in response to a data name sending command, from among the plurality of received commands. The controlling unit 58 of the printer 50 obtains object data corresponding to the data name information 126 from the object data storing area 76. The supplying unit 60 generates displaying data 108 corresponding to the obtained object data. The supplying unit 60 then sends the generated displaying data 108 and the data name information corresponding to the object data to the PC 10. All other processes (S14,S56,S58,S60) are similar to those shown in FIG. 2.

The present embodiments were described in detail above. According to the present embodiments, upon receiving the operation information 110 (e.g. see FIG. 2) from the PC 10, the printer 50 sends the update information 112 including a part of the edited object data to the PC 10 in accordance with the operation information 110. By performing the display update command, the PC 10 can update the displaying data 108 in accordance with the update information 112. As a result, the object displayed in the first area 46 of the displaying unit 26 of the PC 10 is updated. With this configuration, the printer 50 does not need to send all of the edited object data to the PC 10. As a result, a communication load between the printer 50 and the PC 10 may be reduced when the object data is edited.

Further, the printer 50 edits the object data in accordance with the received operation information 110. As a result, the object displayed in the first area 46 and the object corresponding to the object data stored in the printer 50 become identical in content. Hence, the printer 50 may edit the object data in accordance with the operation information 110 from the PC 10. Upon receiving the first type of print instruction 114, the printer 50 performs the print process on the object data stored in the storing unit 74. Hence, the printer 50 may perform the print process on the object data corresponding to the object having an identical content to the object displayed in the first area 46 without receiving print target object data from the PC 10. As a result, the printer 50 can perform print in response to a print instruction from the PC 10. According to the printer 50, the object data can be edited in accordance with the operation information from the PC 10 not installed with the application.

The printer 50 sends the displaying data 108 obtained by converting the object data into a format that can be interpreted by the controlling unit 14 of the PC 10 in accordance with the web browser program 18. Therefore, the PC 10 can display an identical object to the object corresponding to the object data without the need to install an application corresponding to the object data in the PC 10. The user can input characters and the like into the object data by operating the PC 10 without the need to install an application corresponding to the object data in the PC 10. Note that the object data storing area 76 may hold the object data in a format (e.g. HTML) that can be interpreted by the controlling unit 14 of the PC 10 in accordance with the web browser program 18. In this case, there is no need to provide the printer 50 with a mechanism for converting PDL data into a format that can be interpreted by the web browser program 18.

Upon reception of the first type of print instruction 114 (see FIG. 2), the printer 50 performs a printing process on the object data stored in the object data storing area 76. That is, the printer 50 does not have to obtain print subject data from the PC 10 to perform the print process. Therefore, a printing period extending from reception of the first type of print instruction 114 to the completion of print can be shortened. Furthermore, a communication load between the PC 10 and the printer 50 can be reduced.

Upon receiving the second type of print instruction 116 that the PC 10 sends in accordance with the printer driver program 22, the printer 50 performs a print process on the edit web page data included in the second type of print instruction 116. That is, a printing result differs depending on whether the second type of print instruction 116 or the first type of print instruction 114 is received. The user can obtain a desired print result by performing the first printing operation described above when an image represented by the object data is to be printed and performing the second printing operation described above when an image represented by the edit web page data is to be printed.

The printer 50 stores the object data in the object data storing area 76 in the PDL format. Therefore, process in order to convert the object data into the PDL format can be omitted when the printer 50 performs the print process. As a result, the aforementioned print period of the printer 50 can be shortened.

Further, the PC 10 sends the first type of print instruction 114 to the printer 50 in accordance with the web browser program 18. That is, the printer driver program 22 corresponding to the printer 50 does not have to be installed in the PC 10 when the PC 10 sends a print instruction to the printer 50.

Note that the PC 10 described above is an example of an "external device". The editing operation is an example of a "first type of operation", the first print operation is an example of a "second type of operation", the generating operation is an example of a "third type of operation", and the second print operation is an example of a "fourth type of operation". The PDL format (a Postscript format, for example) is an example of a "format that the print performing unit is capable of performing the print process". Note that when the object data is held in the object data storing area 76 in a format that can be interpreted by the web browser program 18, the format that can be interpreted by the web browser program 18 is an example of the "format that the print performing unit is capable of performing the print process".

Modified Examples (1) In the second embodiment, the supplying unit 60 may generate edit web page data 104 including the displaying data 108. More specifically, when the object data is stored by the scanning unit 82 (S74 in FIG. 3), the supplying unit 60 may generate edit web page data 104 including displaying data 108 that corresponds to the object data stored in S74 in response to the first edit web page data sending request 102 received thereafter and send the generated edit web page data 104 to the PC 10. Further, the supplying unit 60 may send edit web page data 104 including displaying data 108 that corresponds to object data edited by the PC 10 previously.

(2) Further, in the above embodiments, the printer 50 sends the update information 112 corresponding to a part of the object data to the PC 10 upon receiving the operation information 110. However, the printer 50 may send displaying data corresponding to all of the object data edited in accordance with the operation information 110. In this case, the displaying data is an example of "update information". Alternatively, the printer 50 may send a new edit web page including the object data edited in accordance with the operation information 110. In this case, the new edit web page data is an example of the "update information".

(3) The printer 50 may store object data in the object data storing area 76 in a format other than the format in which the print performing unit 80 can perform the print process (the PDL format in this embodiment). For example, the object data stored in the object data storing area 76 may be in a format (a text format or a PDF format, for example) corresponding to software included in the web server program 79. In this case, the printer 50 may convert the object data stored in the object data storing area 76 into PDL format data upon reception of the first type of print instruction 114, and then perform the print process.

(4) The PC 10 may not store the printer drive program 22. In this modified example, the PC 10 may send the first type of print instruction 114 in accordance with web browser program 24. The printer 50 may perform the print process (S58 in FIG. 2). The printer 50 may perform print process in response to the first type of print instruction 114 from the PC 10 not installed with the printer driver.

(5) Further, the displaying data 108 is not limited data described by the HTTP format or the HTML format. Alternatively, the update information 112 may be generated using XMLHttpRequest, JSON, or JSONP. In this case, as described in the embodiments, the controlling unit 14 executes the display update command included in the edit web page data 104 such that object data corresponding to the displaying data are displayed in the first area 46.

(6) Moreover, in the above embodiments, the PC 10 converts the edit web page data into PDL data in accordance with the printer driver program 22. Alternatively, the PC 10 may send the second type of print instruction 116 including edit web page data not converted into PDL data to the printer 50. In this case, the printer 50 may convert the received edit web page data into PDL data.

(7) In the foregoing embodiments, respective units 60 to 72 are realized as a result of the controlling unit 58 performing the processes according to the web browser program 79. Nevertheless, at least one unit of respective units 60 to 72 may alternatively be realized by a hardware resource such as a logic circuit.

The invention claimed is:

1. A printer configured to connect with an external device in a communicable manner, the external device comprising a web browser, the printer comprising:

a supplying unit configured to supply edit web page data to the external device for the web browser of the external device to display an edit web page in a case where the external device accesses the printer using the web browser of the external device, wherein the edit web page includes a first area for displaying an object corresponding to object data to be edited and a second area different from the first area;

a storing unit configured to store the object data;

an operation information receiving unit configured to receive operation information corresponding to a first type of operation from the web browser of the external device in a case where the first type of operation is performed to the first area included in the edit web page, the first type of operation including an operation for inputting a character to the first area;

an editing unit configured to edit the object data stored in the storing unit in response to the operation information received by the operation information receiving unit, the editing the object data including writing the character into the object data;

an update information sending unit configured to send update information for updating a displaying content within the edit web page to the web browser of the external device in response to the operation information received by the operation information receiving unit;

a print instruction receiving unit configured to receive a first type of print instruction from the web browser of the external device in a case where a second type of operation is performed to the second area included in the edit web page;

a print performing unit configured to perform a print process using the object data stored in the storing unit in a case where the print instruction receiving unit receives the first type of print instruction;

a generation instruction receiving unit configured to receive a generation instruction for generating new object data from the web browser of the external device in a case where a third type of operation is performed to the second area included in the edit web page, the generation instruction specifying a specific program for generating the new object data; and a generating unit configured to generate the new object data using the specific program in response to the generation instruction received by the generation instruction receiving unit, the new object data representing a new document, in which no text or image data has been input, the new object data being stored for subsequent editing.

2. The printer as in claim 1, wherein
the edit web page data includes command data including a plurality of commands to be performed by the web browser of the external device,
the command data includes:
an operation information sending command for the web browser of the external device to send the operation information corresponding to the first type of operation to the printer in the case where the first type of operation is performed to the first area included in the edit web page;
a display update command for the web browser of the external device to update a displaying content within the first area in accordance with the update information; and a print instruction sending command for the web browser of the external device to send the first type of print instruction to the printer in the case where the second type of operation is performed to the second area included in the edit web page, and the update information sending unit is configured to send the update information for updating the displaying content within the first area to the web browser of the external device.

3. The printer as in claim 1, wherein
the first type of print instruction is a print instruction not including print subject data.

4. The printer as in claim 1, wherein
the external device further comprises a printer driver,
the print instruction receiving unit is configured to receive a second type of print instruction including print data, which is generated by using the edit web page data, from the printer driver in a case where a fourth type of operation is performed using the printer driver, and
in a case where the print instruction receiving unit receives the second type of print instruction, the print performing unit is configured to perform a print process using the print data included in the second type of print instruction regardless of the object data stored in the storing unit.

5. The printer as in claim 1, further comprising:
a scanning unit configured to scan a document,
wherein the storing unit is configured to store specific object data generated by the scanning unit scanning the document, and
the edit web page data supplied by the supplying unit is data for displaying, on the edit web page, the object corresponding to the specific object data preliminarily stored in the storing unit.

6. The printer as in claim 1, wherein
the object data stored in the storing unit is data having a data format that the print performing unit is capable of performing the print process.

7. A system comprising: a printer and an external device, wherein the printer comprises:
a printing unit;
a first interface;
a first storage that stores a program including a web server program; and
a first controller coupled to the printing unit, the first interface and the first storage, wherein the web server program, when executed, causes the first controller to:
receive, via the first interface, a first instruction from the external device, the first instruction comprising an instruction to generate edit web page data;
in response to receiving the first instruction, generate the edit web page data;
transmit, via the first interface, the generated edit web page data to the external device, the generated edit web page data being described in a markup language;
wherein the external device comprises:
a second interface;
a second storage that stores a web browser program;
an operating unit;
a display;
a second controller coupled to the second interface, the second storage, the operating unit and the display, wherein the web browser program, when executed, causes the second controller to:
receive, via the second interface, the generated edit web page data;
display, on the display, an edit web page based on the received edit web page data, the edit web page including a first area and a second area different from the first area;
receive a first operation, via the operating unit, for generating new object data, the new object data representing a blank web page;
generate a second instruction for instructing the printer to generate the new object data, the second instruction specifying a specific program for generating the new object data; and
transmit, via the second interface, the generated second instruction to the printer;
wherein the program including the web server program further causes the first controller to:
receive, via the first interface, the second instruction from the external device;
in response to receiving the second instruction, generate the new object data representing the blank web page;
store the generated new object data in the first storage;
generate display data based on the new object data, the generated display data including data name information; and
transmit, via the first interface, the generated display data to the external device;
wherein the web browser program further causes the second controller to:
receive, via the second interface, the generated display data from the printer;
display the generated display data on the display, the generated display data being displayed in the first area of the edit web page;
receive character string via the operating unit;
generate operation information based on the received character string, the generated operation information including the received character string; and
transmit, via the second interface, the generated operation information to the printer;
wherein the program including the web server program further causes the first controller to:
receive, via the first interface, the generated operation information from the external device;
update the new object data stored in the first storage based on the received operation information, the updated object data including the character string included in the received operation information;
generate update information based on the operation information, the generated update information including the character string; and
transmit, via the first interface, the generated update information to the external device;
wherein the web browser program further causes the second controller to:
receive, via the second interface, the generated update information from the printer;
update the display data based on the received update information, the updated display data including the character string;
display the updated display data on the display, the updated display data being displayed in the first area of the edit web page and includes the character string;
receive first print operation via the operating unit, the first print operation being a selection of a print button in the second area of the edit web page;

in response to receiving the first print operation, generate a first print instruction, the generated first print instruction including the data name information of the updated display data; and transmit, via the second interface, the generated first print instruction to the printer;

wherein the program including the web server program further causes the first controller to:

receive, via the first interface, the first print instruction from the external device;

obtain object data corresponding to the data name information included in the received first print instruction from the first storage; and control the printing unit to print an image represented by the obtained object data.

8. The system as in claim 7, wherein the edit web page data includes a plurality of commands to be performed by the web browser program, the plurality of commands including:

an operation information sending command for transmitting the operation information to the printer;

a display update command for updating the display data to be displayed in the first area of the edit web page in accordance with the update information; and a print instruction sending command for transmitting the first print instruction to the printer, and wherein the update information is for updating the displaying data to be displayed in the first area.

9. The system as in claim 7, wherein the first print instruction does not include print subject data.

10. The system as in claim 7, wherein the second storage of the external device further stores a printer driver program, wherein the web browser program and the printer driver program cause the second controller to:

receive second print operation via the operating unit, the second print operation being a selection of a print menu displayed in a control menu displaying area;

in response to receiving the second print operation, convert the edit web page data into a converted edit web page data described in PDL (Page Description Language) format;

generate a second print instruction, the generated second print instruction including the converted edit web page data; and transmit, via the second interface, the generated second print instruction to the printer;

wherein the program including the web server program further causes the first controller to:

receive, via the first interface, the second print instruction from the external device; and control the printing unit to print an image represented by the converted edit web page data included in the second print instruction.

11. The system as in claim 7, wherein the printer further comprises a scanning unit configured to scan an image on a document, wherein the program including the web server program further causes the first controller to:

control the scanning unit to scan an image on a document;

generate specific object data representing the scanned image by the scanning unit;

store the specific object data in the first storage;

generate the display data based on the specific object data, the display data including the scanned image; and transmit, via the first interface, the generated display data to the external device.

12. A printer comprising:

a printing unit;

a first interface;

a first storage that stores a program including a web server program; and a first controller coupled to the printing unit, the first interface and the first storage, wherein the web server program, when executed, causes the first controller to:

receive, via the first interface, a first instruction from an external device, the first instruction comprising an instruction to generate edit web page data;

in response to receiving the first instruction, generate the edit web page data;

transmit, via the first interface, the generated edit web page data to the external device, the generated edit web page data being described in a markup language;

receive, via the first interface, a second instruction from the external device, the second instruction being for instructing the printer to generated a new object data representing a blank web page, the second instruction specifying a specific program for generating the new object data;

in response to receiving the second instruction, generate the new object data representing the blank web page;

store the generated new object data in the first storage;

generate display data based on the new object data, the generated display data including data name information;

transmit, via the first interface, the generated display data to the external device;

receive, via the first interface, operation information from the external device, the operation information including character string;

update the new object data stored in the first storage based on the received operation information, the updated object data including the character string;

generate update information based on the operation information, the generated update information including the character string;

transmit, via the first interface, the generated update information to the external device;

receive, via the first interface, a first print instruction from the external device, the first print instruction including the data name information of the display data;

obtain object data corresponding to the data name information included in the received first print instruction from the first storage; and control the printing unit to print an image represented by the obtained object data.

* * * * *